United States Patent [19]

Colman

[11] Patent Number: 5,429,002

[45] Date of Patent: Jul. 4, 1995

[54] CORIOLIS-TYPE FLUID MASS FLOW RATE MEASUREMENT DEVICE AND METHOD EMPLOYING A LEAST-SQUARES ALGORITHM

[75] Inventor: Gerald A. Colman, Greenwood, S.C.

[73] Assignee: Schlumberger Industries, Inc., Norcross, Ga.

[21] Appl. No.: 241,423

[22] Filed: May 11, 1994

[51] Int. Cl.[6] .......................... G01F 1/84; G01R 25/00
[52] U.S. Cl. .............................. 73/861.38; 324/76.82; 364/481; 364/510
[58] Field of Search ................. 73/861.37, 861.38; 324/76.82; 364/554, 577, 510, 481

[56] References Cited

U.S. PATENT DOCUMENTS

| Re. 31,450 | 11/1983 | Smith . | |
|---|---|---|---|
| 4,065,665 | 12/1977 | Rietsch | 324/76.82 |
| 4,422,338 | 12/1983 | Smith . | |
| 4,491,025 | 1/1985 | Smith . | |
| 4,582,410 | 8/1989 | Corwon et al. . | |
| 4,934,196 | 6/1990 | Romano . | |
| 5,052,231 | 10/1991 | Christ et al. | 73/861.38 |
| 5,235,287 | 8/1993 | Sanderson et al. | 324/76.82 |

Primary Examiner—Herbert Goldstein
Attorney, Agent, or Firm—Sanford J. Asman

[57] ABSTRACT

A Coriolis-type fluid flow rate measuring system splits a fluid flow that is to be measured into two equal half flows and passes the same respectively through two physically similar conduits which are oscillated about respective parallel oscillation axes. Analog sinusoidal signals corresponding to relative velocity of motion between the two conduits are obtained at two locations, the analog signals a digitized, and a conventional microprocessor is used to apply a least-squares sine fit to the digitized data to determine to a very high degree of accuracy a phase shift between the signals. An empirical proportionality factor is determined for the system to relate phase shift to fluid flow rate and is used to determine the fluid flow rate. The least-squares sine fit provides an accurate, economically computed fluid flow rate, and the apparatus is highly insensitive to temperature induced effects, harmonic distortions, and the combined effects of noise and harmonic distortion.

12 Claims, 9 Drawing Sheets

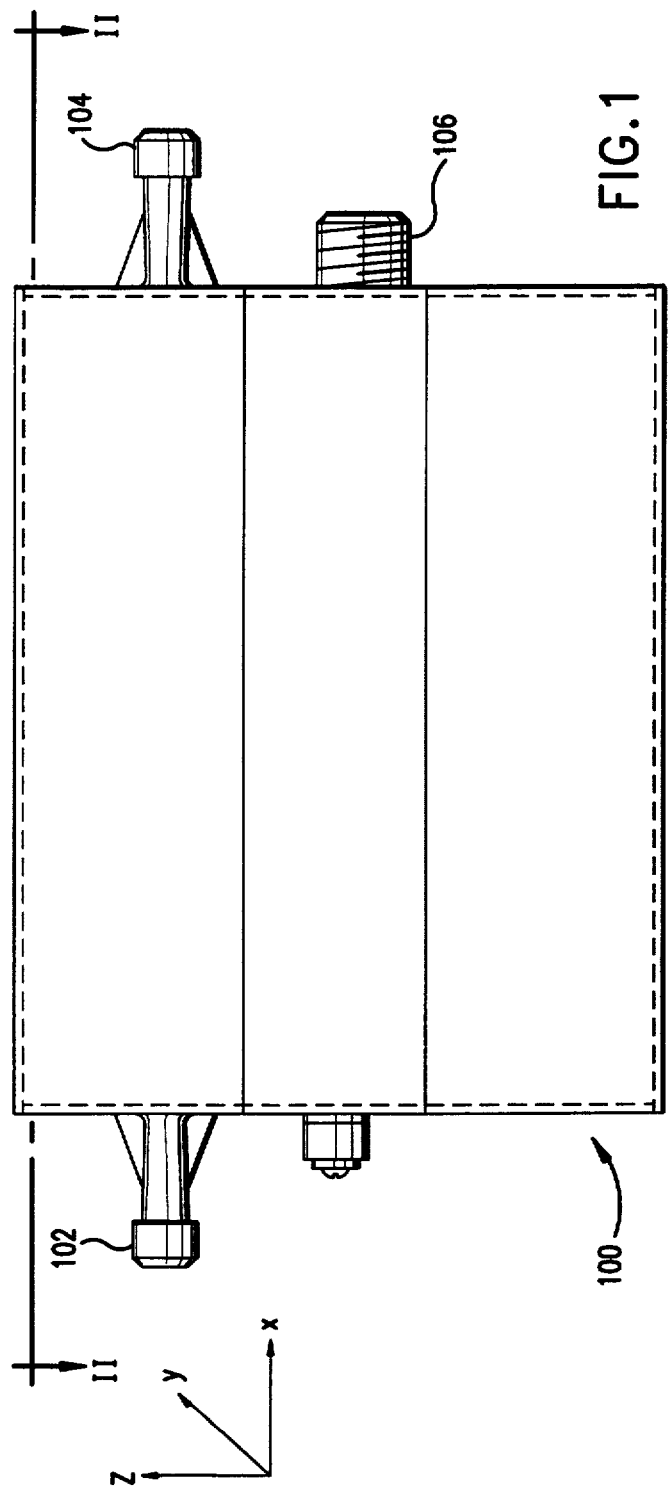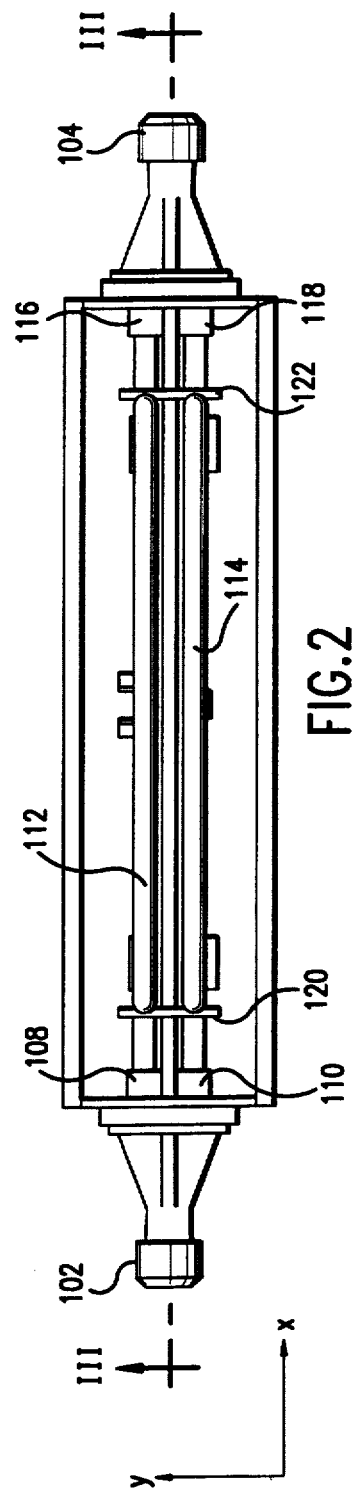

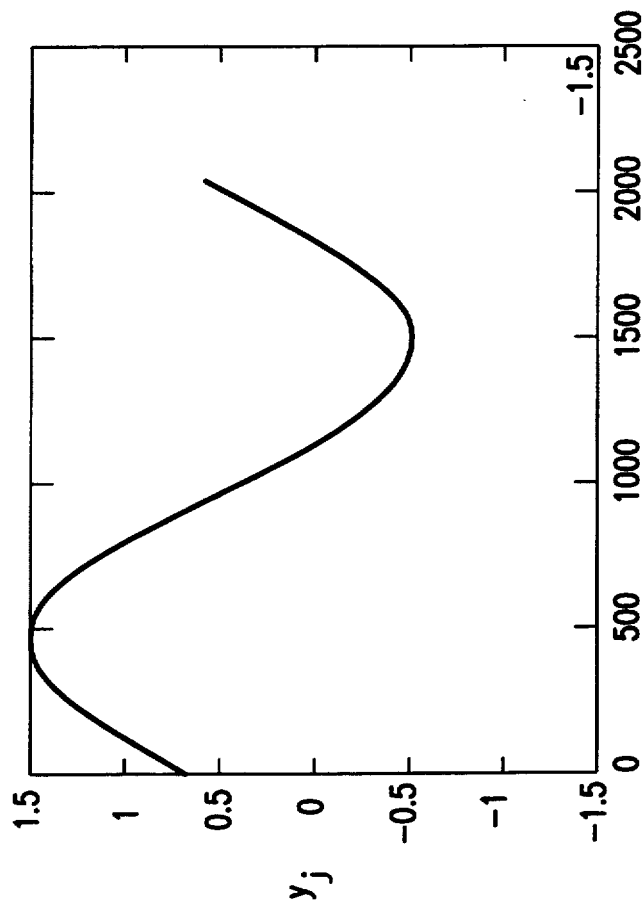
FIG.15A
$$y_j = 0.5 + A \cdot \sin\left[2\cdot\pi\cdot DT\cdot\frac{j}{T} + 2\cdot\pi\cdot\frac{P}{360}\right]$$
FIG.15B
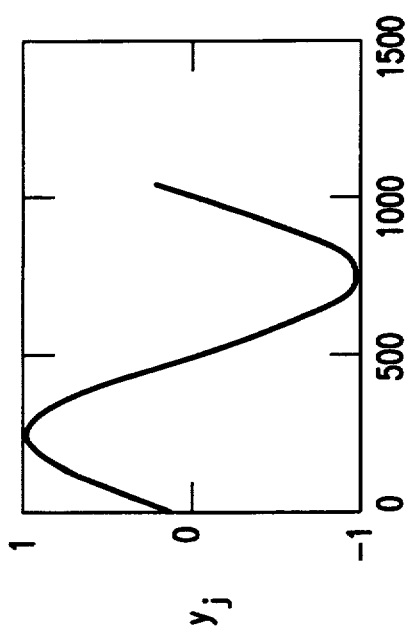
FIG.14A
$$y_j = A \cdot \sin\left[2\cdot\pi\cdot DT\cdot\frac{j}{T} + 2\cdot\pi\cdot\frac{P}{360}\right]$$
FIG.14B

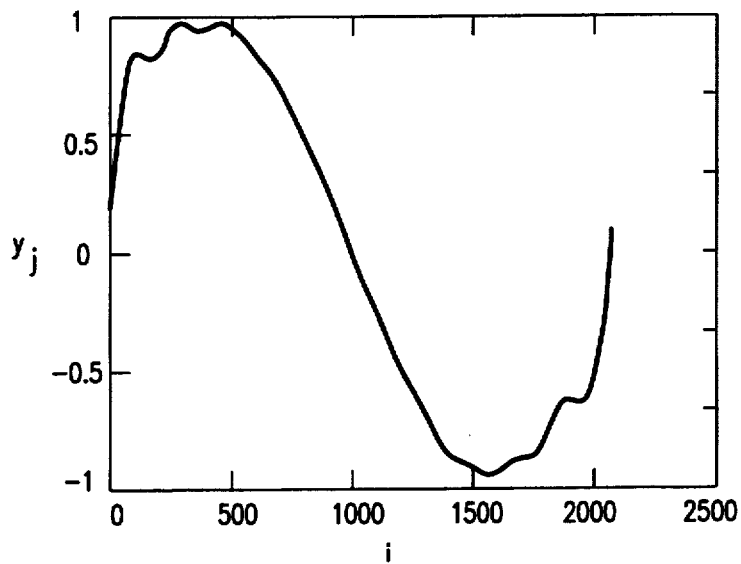

FIG.16A $$y_j = A \cdot \sin\left[2\cdot\pi\cdot DT\cdot \frac{j}{T} + 2\cdot\pi\cdot \frac{P}{360}\right] + \sum_h \frac{0.3}{h}\cdot A\cdot \sin\left[2\cdot\pi\cdot h\cdot DT\cdot \frac{j}{T}\right]$$

FIG.16B

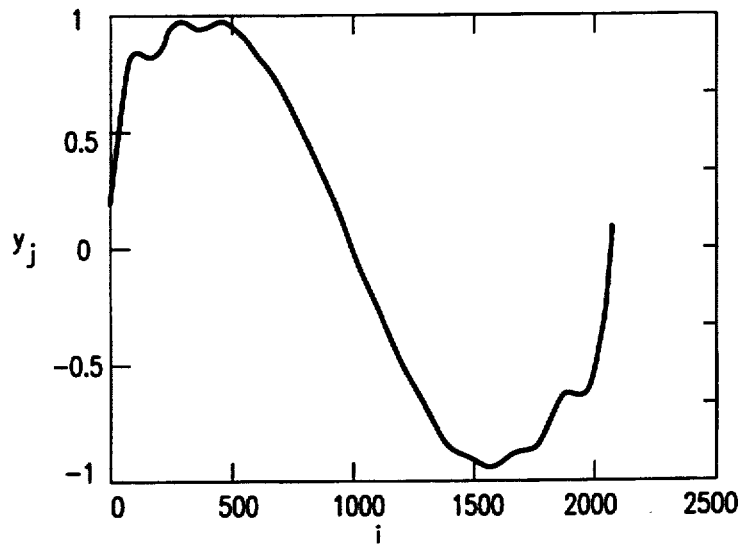

FIG.17A $$y_j = \text{rnd}(0.01) - 0.005 + A\cdot \sin\left[2\cdot\pi\cdot DT\cdot \frac{j}{T} + 2\cdot\pi\cdot \frac{P}{360}\right] + \sum_h \frac{0.3}{h}\cdot A\cdot \sin\left[2\cdot\pi\cdot h\cdot DT\cdot \frac{j}{T}\right]$$

FIG.17B

CORIOLIS-TYPE FLUID MASS FLOW RATE MEASUREMENT DEVICE AND METHOD EMPLOYING A LEAST-SQUARES ALGORITHM

FIELD OF THE INVENTION

This invention relates to a Coriolis-type fluid mass flow rate meter which is substantially immune to temperature variations, harmonic distortions and random noise, and more particularly to a device and a method employing a least-squares technique of quickly, economically, and accurately determining the mass flow rate of a flowing fluid.

BACKGROUND OF THE PRIOR ART

A variety of Coriolis-type fluid flow rate measuring devices are known and commercially available. In such devices, one or two fluid flows are typically conveyed through rotating or oscillating conduits, typically driven into oscillation by one or more electromagnetic oscillators acting at a resonant frequency of the system. This produces a Coriolis acceleration acting on the flowing fluid, and results in a Coriolis force directed perpendicular to the flow path and in ultimate opposing directions as between two legs of each conduit. This causes a sinusoidal time-varying twisting motion of the conduit which can be sensed by conventional motion sensors to generate corresponding analog sinusoidal outputs of measurable amplitude, frequency, and phase relative to a selected reference. By determining a phase difference between such sinusoidal outputs from two sensors, each sensing a motion at a different predetermined location on the conduit carrying the flow, it is possible to determine the mass flow rate of the fluid flow through the conduit.

The fundamental frequency of the system depends on the mechanical characteristics of the conduit, the density and composition of the fluid, the temperature, etc. There are also other relatively complex factors, e.g., turbulence in the flow, the presence of harmonics and/or noise generated in the system itself or brought thereto by the elements utilized to produce the oscillation of the conduit, which affect the accuracy of the measured fluid mass flow rate. As noted earlier, numerous devices and techniques for addressing some of these problems are known in the art.

Some of the earlier known Coriolis-type fluid flow rate measuring devices, for example per U.S. Pat. No. Re. 31,450, to Smith, titled "METHOD AND STRUCTURE FOR FLOW MEASUREMENT", issued on Nov. 29, 1983, determine a time difference "$\Delta t$" between sinusoidal outputs from two sensors and then obtain the desired fluid mass flow rate via a scale factor. Similar in this respect, though using different structures, are devices taught in U.S. Pat. No. 4,422,338, also to Smith, titled "METHOD AND APPARATUS FOR MASS FLOW MEASUREMENT", issued on Dec. 27, 1983, and U.S. Pat. No. 4,491,025, to Smith et al., titled "PARALLEL PATH CORIOLIS MASS FLOW RATE METER", issued on Jan. 1, 1985. The common factor in each of these devices is their exclusive use of a time interval "$\Delta t$" instead of a phase difference between two related sinusoidal outputs.

More recent developments have established that superior results, free of extraneous influences, can be obtained regardless of the flow tube geometries employed by first determining a phase difference between sinusoidal outputs from two sensors and then determining the corresponding fluid mass flow rate in devices.

U.S. Pat. No. 4,934,196, to Romano, titled "CORIOLIS MASS FLOW RATE METER HAVING A SUBSTANTIALLY INCREASED NOISE IMMUNITY", issued on Jun. 19, 1990, teaches an apparatus employing two inverted U-shaped tubular conduits driven in oscillation, which employs a Discrete Fourier Transform (DFT) evaluated at the fundamental (selected) frequency to yield corresponding frequency values specifically formed of the values of the real and imaginary components for a single frequency component. From the values of these components for both of two sensor signals, a phase angle difference therebetween is computed and the fluid mass flow rate determined therefrom. The DFT algorithm employed in Romano requires rather intense and complex computation, i.e., imposes a relatively severe computational burden on the system.

U.S. Pat. No. 4,852,410, to Corwon et al., titled "OMEGA-SHAPED CORIOLIS-TYPE MASS FLOW RATE METER", issued Aug. 1, 1989, teaches a device which employs two parallel, Omega-shaped conduits. The mass flow rate is deduced from changes in the phase difference of signals from sensors at outboard curved portions of the Omega-shaped conduits which measure the relative positions of the oscillating conduits. The principal focus in this reference is on reducing the bending stress in the conduits, reducing the response/drive frequency ratio to enable the generation of a larger phase shift for a given mass flow rate, and increasing the measurement sensitivity as compared with known U-shaped designs to permit the use of conduits of larger diameter which have a lower flow resistance and a lower pressure drop for a given fluid flow.

The present invention provides for the inclusion of elements to perform an algorithm employing a least-squares technique, to swiftly, economically and accurately determine the desired phase difference and hence the fluid mass flow rate, in a Coriolis-type flow meter system employing any conventional conduit form. The following detailed description of the invention, for convenience of explanation, describes the present invention as one incorporating the structural aspects of the conduits, the drive mechanisms, the sensors, and the omega-shaped conduits as in Corwon et al.

U.S. Pat. No. 4,852,410, to Corwon et al., is therefore expressly incorporated herein by reference for its teaching pertaining to the structures taught therein. The present invention, however, is considered to be an improvement thereover because it employs a specific highly efficient and economical algorithm to process the data in a manner that significantly reduces errors due to temperature effects, undesirable harmonics and extraneous noise in the system.

SUMMARY OF THE INVENTION

Accordingly, it is a principal object of this invention to provide an improved Coriolis-type fluid flow rate measuring system employing least-squares fits to sinusoidal data signals to precisely, economically and accurately determine a fluid flow rate through the system.

In another aspect of the system, there is provided an improved method for measuring a fluid flow rate with a Coriolis-type flow meter, wherein analog sinusoidal signals are digitized and processed with a least-squares sine fit to quickly, economically, and precisely determine a phase shift between the sinusoidal signals to thereby determine the fluid flow rate in a manner highly insensitive to extraneous influences such as harmonic distortions, temperature influences, and noise.

In a preferred embodiment, there is provided an improved Coriolis-type system for measuring the fluid flow rate, the system including a first fluid flow conduit having fixed inlet and outlet portions which are substantially coaxial with a first oscillation axis and includes an offset middle portion which includes a curve. A second fluid flow conduit is provided to be parallel to the first fluid flow conduit between their respective end portions when not in use, and is physically similar to the first fluid flow conduit. The second fluid flow conduit is mounted with its respective inlet and outlet portions substantially coaxial with a second oscillation axis parallel to the first oscillation axis. Means are provided for oscillating the first and second conduits relative to each other about their respective oscillation axis. This causes oscillating Coriolis accelerations to act on the respective fluid flows through the two conduits, and this generates a corresponding relative oscillatory motion of the conduits. Sensor means are provided for generating analog sinusoidal outputs at two locations in correspondence with the relative motions between the two conduits at these two locations. Digitizing means are used to digitize the analog sinusoidal outputs, and processing means utilize the digitized outputs to generate least-squares sine fits thereto. This enables precise, quick and economical determination of a phase shift between the digitized outputs, and the phase shift is used to determine a corresponding mass flow rate of fluids flowing through the first and second conduits.

In another aspect of the invention, there is provided a method for determining a phase shift difference between a first sinusoidal analog signal having a predetermined frequency and a second sinusoidal analog signal having the same predetermined frequency, wherein the first and second sinusoidal signals are phase-shifted relative to each other in correspondence with a physical parameter. The method includes the steps of converting the first and second sinusoidal analog signals to corresponding first and second digitized signals, generating least-squares sine fits to the first and second digitized signals and thereby determining a phase shift between the first and second analog signals, and determining a value of the physical parameter corresponding to the determined phase shift.

BRIEF DESCRIPTION OF THE DRAWING

FIG. 1 is a side elevation view of a Coriolis-type fluid mass flow rate measuring device according to a preferred embodiment, having internal structure generally similar to that taught in Corwon et al. which is incorporated hereby by reference.

FIG. 2 is a partial cross-section view at Section II—II in FIG. 1.

FIG. 14 is a plot representing a least-squares fit to a pure sinusoidal signal.

FIG. 15 is a plot of a mathematical simulation of a least-squares sine fit, including a temperature-induced effect to a sinusoidal signal.

FIG. 16 is a plot of a mathematical simulation of a least-squares sine fit, including the effects of a harmonic distortion to a sinusoidal signal.

FIG. 17 is a plot of a mathematical simulation of a least-squares sine fit, including the effects of both random noise and a harmonic distortion to a sinusoidal signal.

DETAILED DESCRIPTION OF THE PREFERRED EMBODIMENTS

Figure 3:
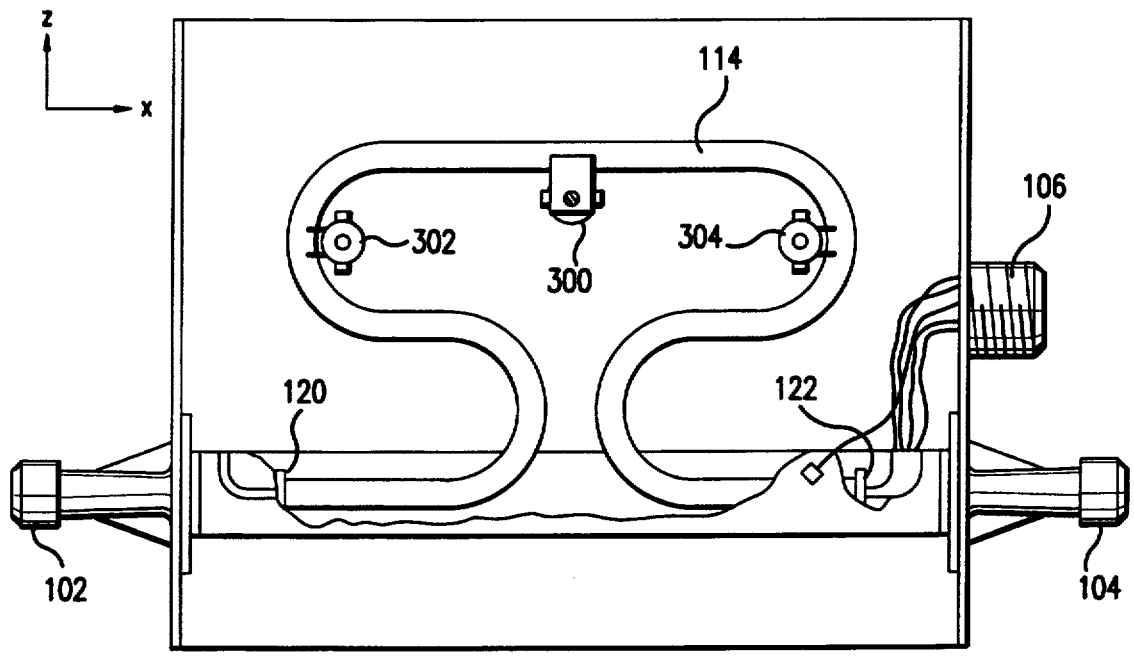
FIG. 3 is a partial cross-sectional plan view of the internal structure of the device per FIG. 1, taken at Section III—III in FIG. 2.

As best seen in FIG. 1, in a side elevation view a typical Coriolis-type fluid flow rate meter 100 has a generally overall cubical casing with fluid conduit connections 102 and 104 extending from opposite end faces, one to be connected to a fluid flow supply and the other to allow exit of the metered flow. Also provided at one end face is an electrical connector element 106 to provide a single location at which the necessary electrical connections may be made to a drive element and sensors, as described more fully hereinbelow.

A coordinate triad, to indicate the respective orientation of reference axes x, y, and z, is also provided as part of FIG. 1 to facilitate reference to various axes and orientations in subsequent figures.

FIG. 2 is a view at Section II—II of the preferred embodiment, and shows how each of the connections 102 and 104 comprises an internal manifold structure causing the incoming flow through 102 to split into two flows passing through outlets 108, 110, respectively, into two physically similarly structured fluid flow conduits 112, 114, made of the same material, manufactured to the same dimensions and specifications, of the same length and curvature (as described below), and having the same mechanical and temperature responses. Thus, there is intended a symmetry of flow through the conduits 112 and 114 and Coriolis-related responses therefrom.

The flows through conduits 112 and 114 are received into openings 116 and 118 in the manifold portion of connection 104, are united, and flow out through connection 104. Note that conduits 112 and 114 are firmly affixed near their distal ends by support brackets 120, 122 which are themselves firmly affixed to the casing of the meter 100. In this manner, the ends of the conduits 112 and 114 are rigidly affixed and support the conduits within the space inside the casing of meter 110. As will be appreciated from x, y axis indicators to the left of the cross-sectional view in FIG. 2, this figure represents a view looking vertically downward, i.e., each of the curved conduits 112 and 114, when not in use for metering purposes, essentially lies in a vertical plane and the two conduits are parallel to each other.

As best seen in the partial cross-sectional view in FIG. 3, a drive mechanism 300 is provided at a central point in the omega-shaped flow conduit 114. As explained below with reference to FIG. 5, this drive mechanism 300 comprises two relatively moveable parts, each of which is respectively firmly affixed to one or the other of the conduits 112 and 114. Some of the electrical wiring is not shown in FIG. 3 to avoid confusion, but it should be understood that electrical power is provided to the drive mechanism 300 to provide a sinusoidally oscillating input at a selectable frequency, to apply a force to both of conduits 112 and 114 so that they are simultaneously pushed apart or brought closer to each other.

Also seen in FIG. 3 are two sensors 302 and 304, which may be of any known type and may be structurally generally similar to the drive mechanism 300. Each of the sensors 302 and 304, in the preferred embodiments, comprises two elements, one of which is affixed to one of the conduits, e.g., 112, and the other to the other of the two conduits, e.g., 114. Each of sensors 302, 304 is also electrically connected to receive from the respective sensor a sinusoidally time-varying electrical signal corresponding to a measured parameter, preferably the relative velocity of motion between the two conduits 112 and 114 at the sensor location. Although sensors 302 and 304 may in principle be mounted at other positions, it is preferred that they be mounted as shown, i.e., at locations where the relative velocity of motion between conduits 112 and 114 is expected to have its maximum amplitude. This happens to be at the maximum x-directional separations between the curved portions of conduits 112 and 114.

It should be understood that although the exemplary embodiment discussed in FIGS. 1-3 is structurally the same as that taught in Corwon et al., which provides detailed descriptions of various components (incorporated herein by reference), other configurations, e.g., U-shaped, may also be utilized. The most important aspect of the present invention is that for any Coriolis-type fluid flow rate metering device or system, in which an oscillatory sinusoidal input is provided to drive two tubes so as to generate two sinusoidal output signals from appropriately placed sensors, a phase difference between the two output signals is determined quickly, accurately and economically to determine therefrom the mass flow rate of fluid through the two conduits combined.

Figure 4:
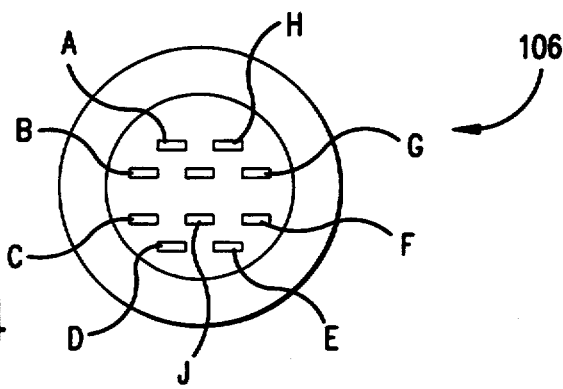
FIG. 4 is an end elevation view of an electrical connector for providing electrical power and extracting analog signals from sensors in the embodiment per FIG. 3.

FIG. 4 is a vertical elevation view of electrical connector 106, and indicates generally the type of connections that may readily be made thereto. As shown, in FIG. 4, connector 106 has terminals referenced by the letters A–G. These terminals are used to bring in signals to energize the driver coil; to detect the signals from the two sensor coils; and to determine and compensate for the temperature of the resistance temperature detector ("RTD").

Figure 5:
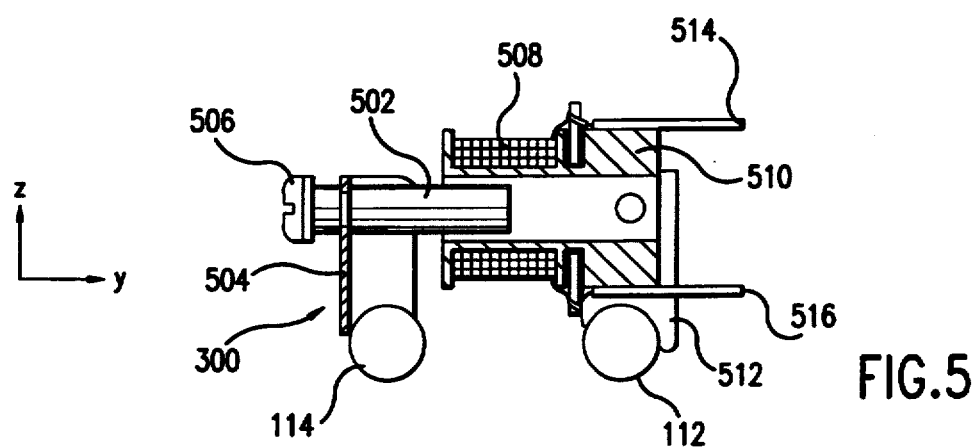
FIG. 5 is an axial cross-sectional view of an exemplary electromagnetic mechanism of known type for selectively providing a sinusoidal drive or for sensing a sinusoidal output signal, as used in the preferred embodiment.

FIG. 5 is an axial cross-sectional view of the essential components of drive mechanism 300. Numerous such devices are commercially available, and the one illustrated in FIG. 5 is considered to be a relatively simple type that is easy to install and maintain. Basically, it comprises a movable magnetic core element 502 mounted by a bracket 504 to one of the flow conduits, e.g., 114, at the location best seen in FIG. 3. Note that a screw adjustment 506 may be provided to move the magnetic core element 502 with respect to bracket 504 in the y-direction. A cooperating magnetizing wire coil 508 is mounted on a hollow armature 510 supported on bracket 512 affixed to flow conduit 112. Electrical connections 514, 516 may be connected to wires accessible through connector 106. Thus, when a sinusoidally varying current of selected frequency is provided to coil 508, it generates a corresponding time-varying sinusoidally altering magnetic field which cooperates with core 502 to cause a sinusoidally time-varying force tending to bring together flow conduits 112, 114 towards each other in one half of a cycle and forcing them apart in a second half of each cycle, along the y-direction.

Any known type of frequency control or circuit may be utilized to adjust the frequency of the input to drive mechanism 300. The drive input must be provided at the natural frequency of the conduits with fluid therein. This is readily determined in practice as the frequency which produces the maximum amplitude of motion, and the control microprocessor can be programmed to indicate when this occurs. Likewise, through screw-adjustment 506, the amount of force available to drive the tubes may also be adjusted as desired. Again, it is noted that the structural details of the drive mechanism, the sensors, and the like are merely intended to explain an exemplary embodiment and that other commercially available types of mechanisms may be used instead. For additional details, reference may be had to Corwon et al.

Figure 6:
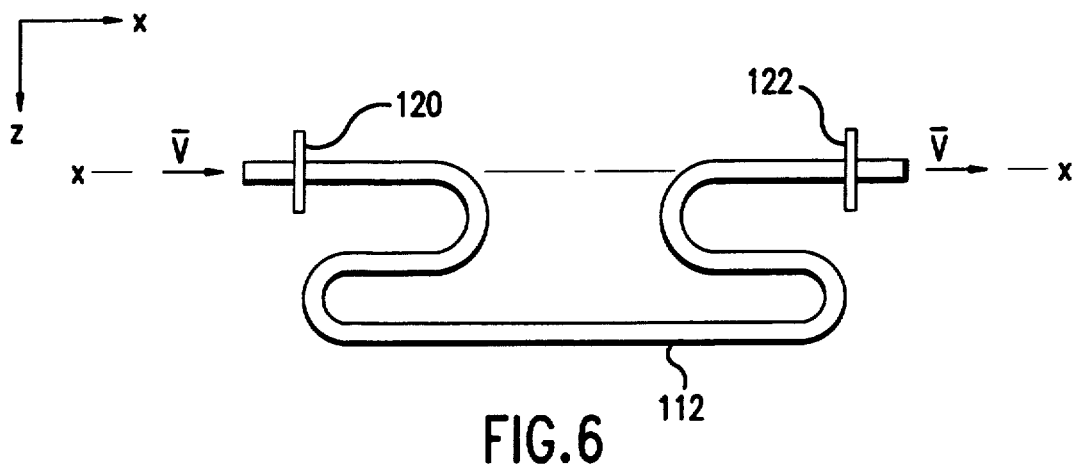
FIG. 6 is a schematic plan view of one of the omega-shaped conduits through which fluid flows in the preferred embodiment.
Figure 7:
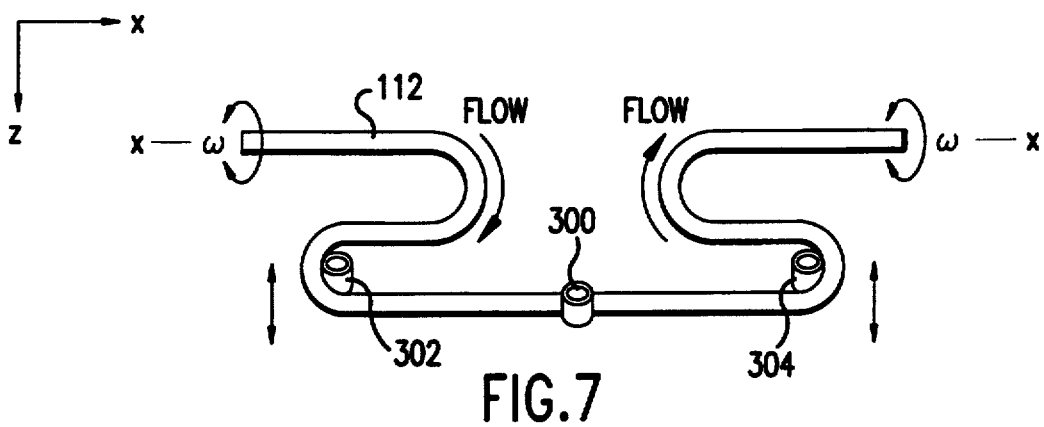
FIG. 7 is another schematic plan view of an omega-shaped conduit in the preferred embodiment, including a drive coil, two sensors, and assorted motions and accelerations.

As indicated in FIG. 6, flow through each of the omega-shaped flow conduits 112, 114 enters at a fixed straight end portion, with a mass-average velocity $\overline{V}$ and leaves with the same mass-average velocity at the opposite end after having passed through four curves within the conduit. As further seen with reference to FIG. 7, upon provision of electrical power to the magnetizing coil of drive mechanism 300, the curved portion of the tube will oscillate about axis X—X with an angular velocity "$\omega$". At the sensors 302 (upstream) and 304 (downstream) the relative velocity of motion between the flow conduits 112 and 114, in the y-direction, is sensed as the core moves relative to the coil in each sensor (as best understood with reference to FIG. 5). The motion being sensed is indicated by the doubled-headed arrows which should be understood as being aligned essentially in the y-direction.

Figure 8:
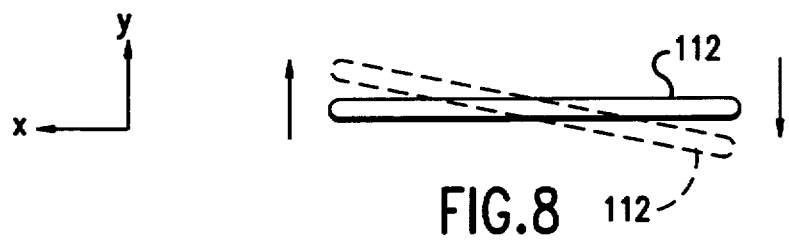
FIG. 8 is a schematic partial view of the omega-shaped conduit according to the preferred embodiment, to explain the manner in which the Coriolis force causes twisting thereof during use.
Figure 9:
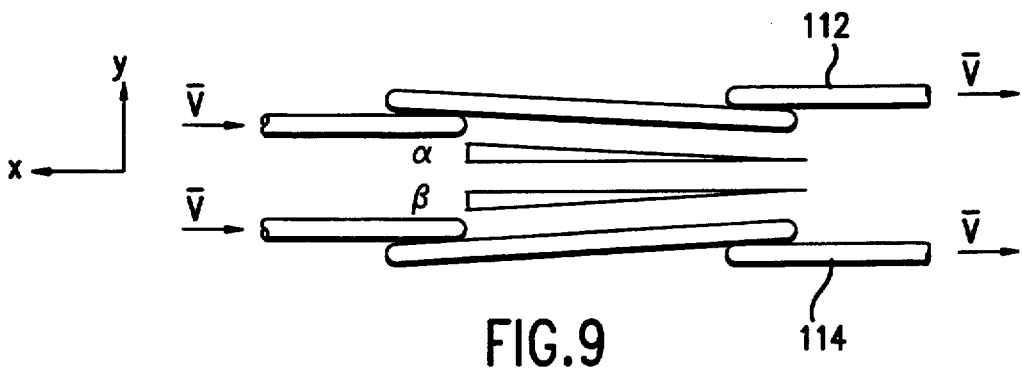
FIG. 9 is a schematic end-on view of the two omega-shaped fluid flow conduits and the conditions of operation when portions of each conduit are in oscillation.

FIG. 8 should be helpful in visualizing how Coriolis force generated by the coaction of the mass-average flow velocity $\overline{V}$ and the time-varying angular velocity "$\omega$" causes the conduits 112, 114 to twist at the same frequency as the drive frequency. Reference to FIG. 9 clearly enables one to visualize the angular separation of the portions of conduits 112, 114 between the sensors at one point in the oscillation cycle. Each of these conduit portions moves away from the other near one of the sensors while corresponding portions near the other sensor move toward each other. Thus, with respect to an imaginary mid-plane between the two conduits, the portions of each conduit between the sensors move in opposite directions by a small angle. Provided the conduits are, as intended, physically similar to each other, and the flow therethrough split evenly, these two small angles $\alpha$ and $\beta$ should be equal. This, however, is not essential and should not affect the accuracy of the computed mass flow rate as described immediately below.

Figure 10A:
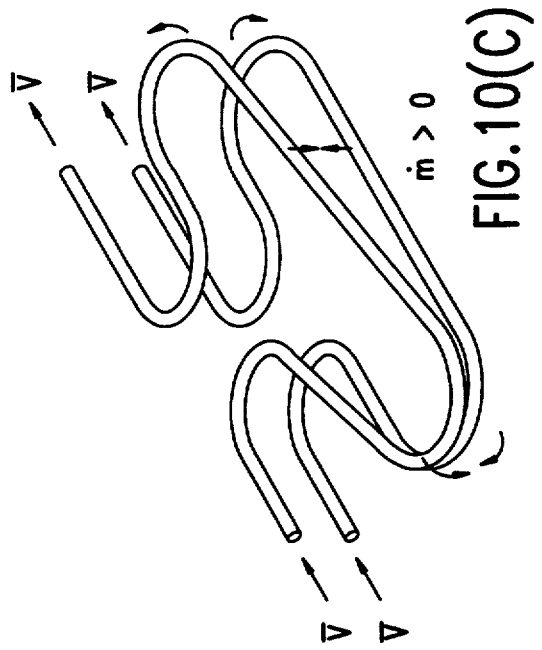
FIG. 10(A) in schematic form illustrates the two omega-shaped conduits of the preferred embodiment in one disposition during use of the device when there is fluid flow through the conduits.
Figure 10B:
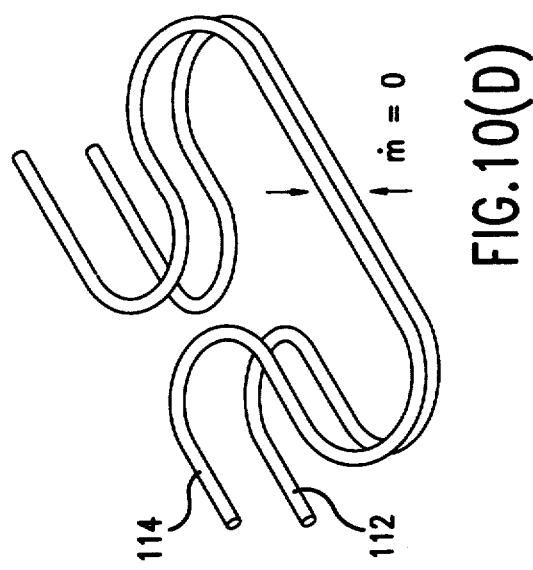
FIG. 10(B) illustrates the same conduits being forced apart by the drive mechanism when there is no fluid flow therethrough.
Figure 10C:
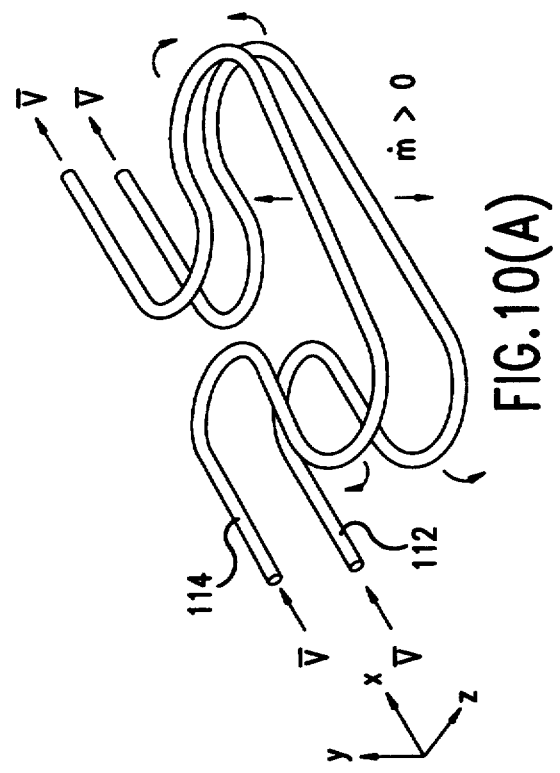
FIG. 10(C) illustrates in schematic form the two omega-shaped conduits half an oscillation away from the positions shown in FIG. 10(A) when there is fluid flow through both conduits.
Figure 10D:
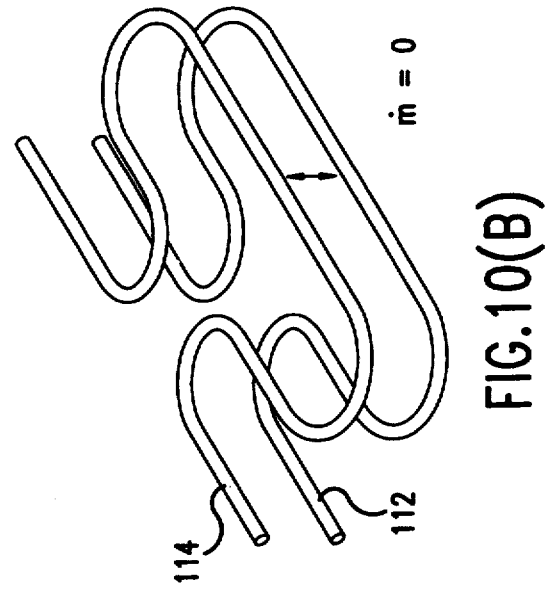
FIG. 10(D) illustrates schematically the two omega-shaped conduits in the preferred embodiment when there is no fluid flow and the drive mechanism has oscillated them to a position half an oscillation away from that illustrated in FIG. 10(B).

Per FIG. 10(A), as explained earlier, when there is fluid flow through both conduits 112 and 114, and the sinusoidal drive mechanism 300 is active, the portions of the conduits between the sensors 302, 304 may in one half of the cycle move as shown. In this half of the cycle, the drive mechanism 300 is driving the two conduits 112, 114 further apart from each other. In the second half of the cycle, when the drive mechanism is drawing the conduits closer towards each other, as indicated by arrows headed towards each other, the conduits will twist in the opposite sense due to the presence of the Coriolis force. The reason for this reversal in direction of twist is directly related to the reversal in the direction of the Coriolis force caused by the opposite direction of the drive in this half of the cycle. FIGS. 10(B) and 10(D) indicate what would happen if there was no flow through the conduits, i.e, the conduits would be driven away from each other and toward each other only, and would not twist because of the lack of Coriolis force.

Figure 11:
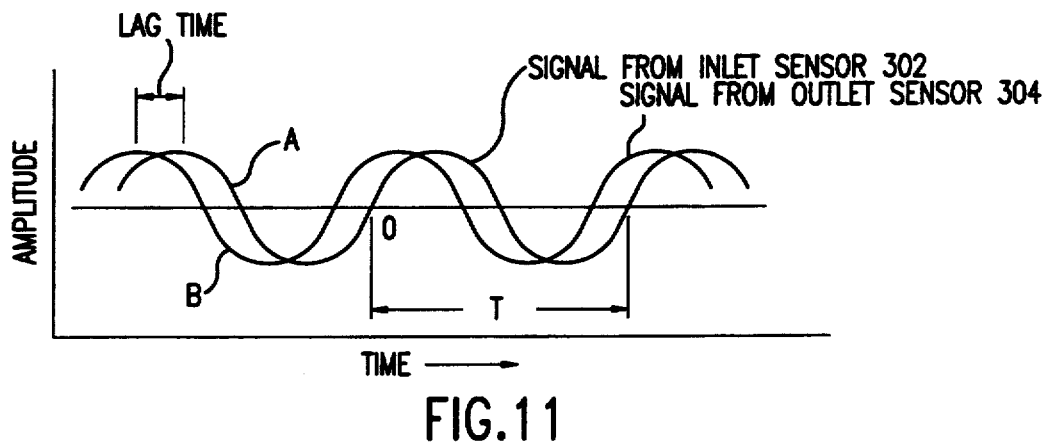
FIG. 11 is an amplitude-time plot to schematically explain the phase difference between the sinusoidal signals from two sensors as employed in the preferred embodiment.

FIG. 11 is a simultaneous plot of amplitude vs. time for the analog sinusoidal time-varying signals obtained from sensors 302 and 304 when the flow meter is in use. For purposes of future reference, particularly in the computations and calculations discussed below, these signals will be referred to by the letters "A" and "B", and these letters will also be correspondingly used as subscripts on symbols for various parameters and coefficients as necessary. The phase angle difference between the two sinusoidal signals corresponds directly to the lag time, i.e., the times at which the respective sinusoidal analog outputs reach their maxima, minima or cross through their corresponding zero-amplitude positions.

As mentioned earlier, such outputs are produced with substantially the same mechanical structure in the device taught in Corwon et al. However, in that reference the sinusoidal signals are processed by applying Discrete Fourier Transforms to the partially-processed signals. Unlike Corwon et al., however, the present invention employs an entirely different technique for processing the data represented by the analog sinusoidal curves per FIG. 11, as more fully described below.

Figure 12:
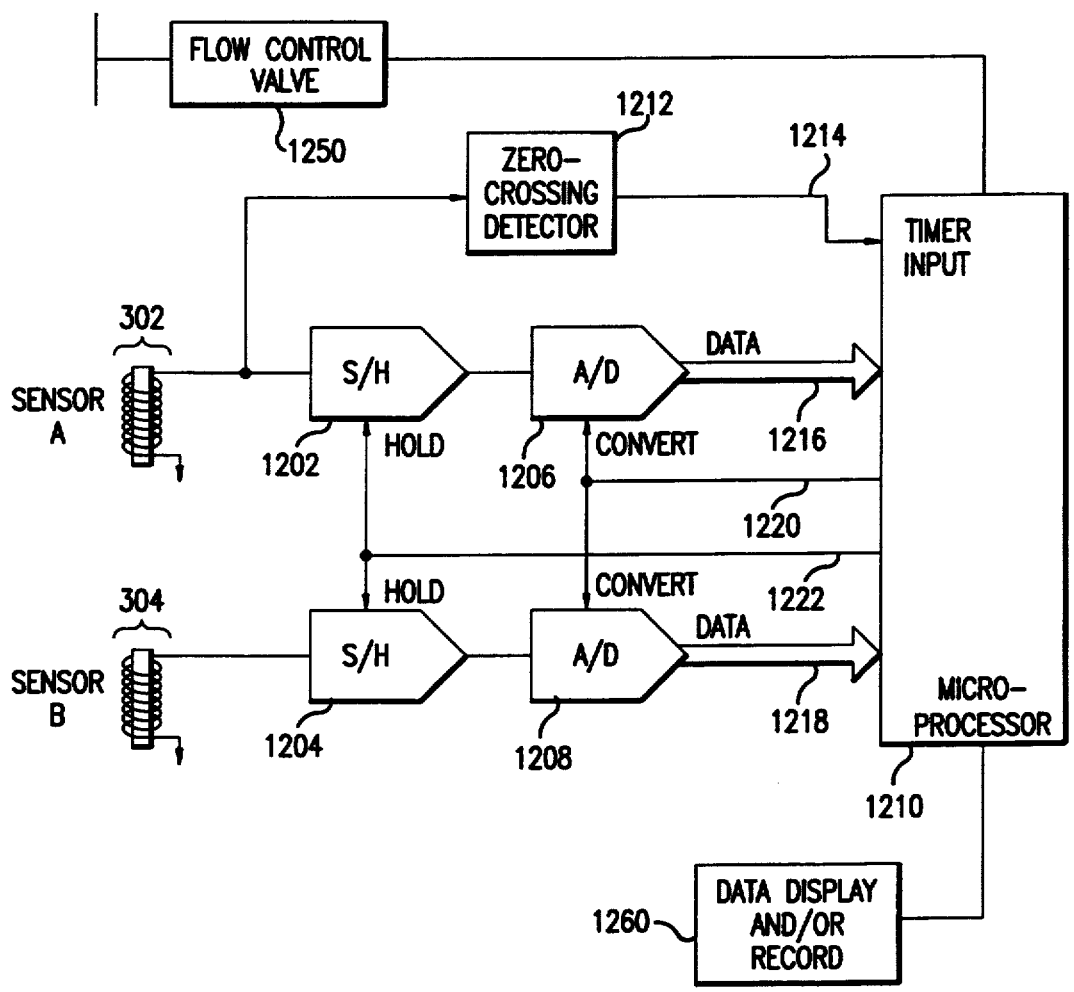
FIG. 12 is a schematic block diagram to explain how analog signals received from two sensors are digitized and, with a zero-crossing detector signal, provided as inputs to a microprocessor for least-squares processing of the digitized signals to determine the fluid mass flow rate in the preferred embodiment.

FIG. 12, in schematic form, shows how the signals received from sensors 302 and 304 are directed to respective sample-and-hold (S/H) circuits elements where each of the signals is held for a complete sample time of T/1000. These S/H circuits 1202, 1204 are respectively connected to sensors 302 and 304 by signal paths in the form of conventional electrical wiring. They are also respectively connected to corresponding analog/digital "A/D" converters 1206 and 1208 respectively, for conversion therein of the sampled and held data corresponding to a single sample time T/1000. Digitized data outputs from A/D converters 1206, 1208 are provided to a suitable microprocessor 1210 via conventional signal paths, i.e., wiring.

Also, by means of a conventional zero-crossing detector 1212, one of the sinusoidal signals, e.g., 302, is utilized to determine a set of three successive zero-crossing points corresponding to a complete sine wave and hence a complete oscillation period. One such zero point is indicated by "0" in FIG. 11. This zero-crossing detector 1212 comprises a known type of circuit system or element, of which many are known to persons of ordinary skill in the art. The output from zero-crossing detector 1212 is provided as timer input to microprocessor 1210 to identify the start of a period "T" during which the incoming analog sinusoidal signals are least-squares fitted over 1,000 equal intervals. Obviously, persons of ordinary skill in the art will appreciate that more or less than 1,000 intervals over a single oscillation period may be employed and that the selected number is only exemplary. Studies show that this number is entirely satisfactory for a wide range of flow measurements.

As best seen in FIG. 12, microcomputer 1210 receives the timer input from zero-crossing detector 1212 through signal path or wire 1214. It also receives the two streams of digitized data from A/D converters 1206, 1208, through data links 1216 and 1218 respectively. Microprocessor 1210 also has a control link 1220 through which it controls A/D converters 1206 and 1208, and another control link 1222 by which it controls the S/H.

Figure 13:
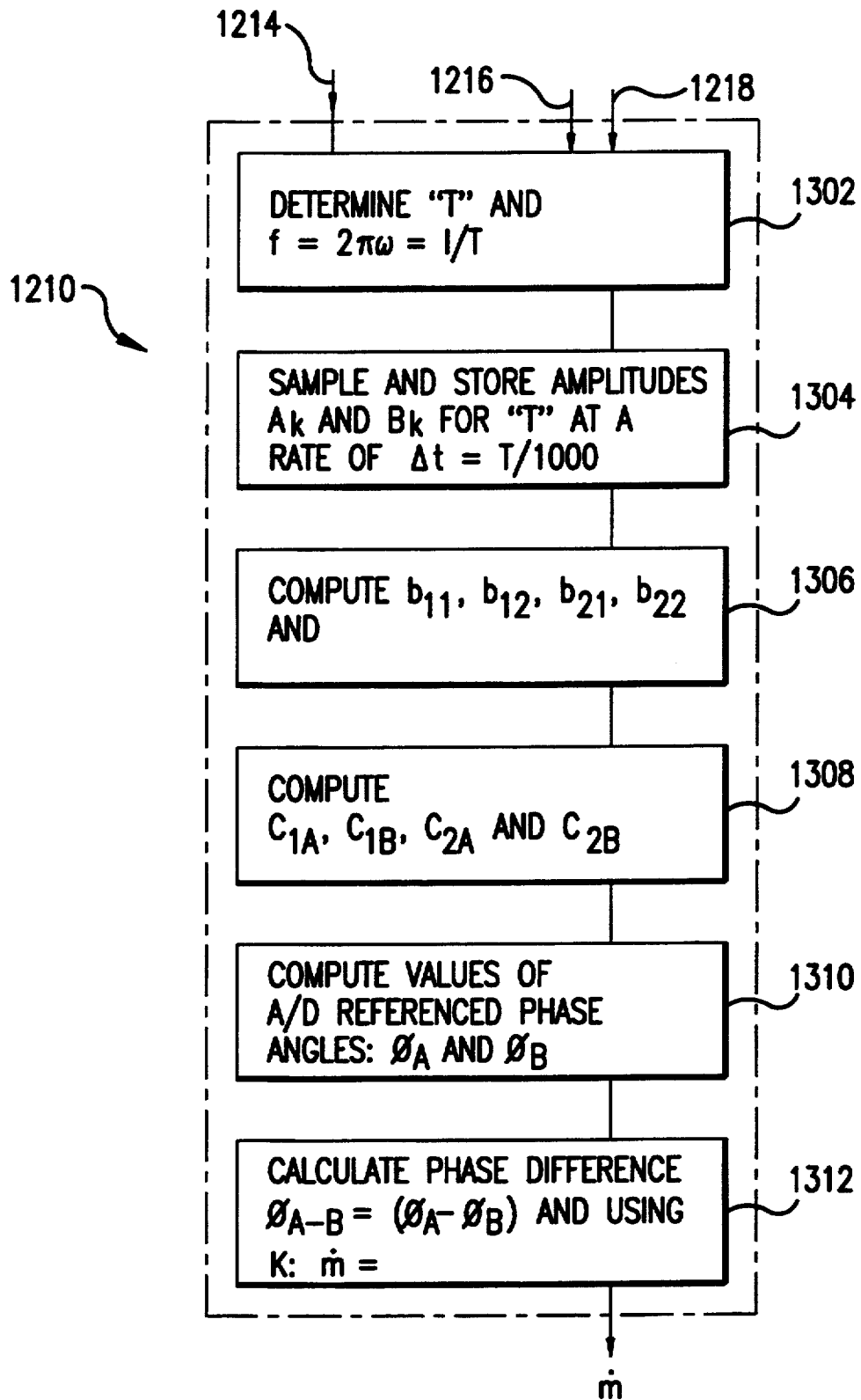
FIG. 13 is a flow chart to explain how digitized data signals (DDS) received by the microprocessor are processed to determine the fluid mass flow rate.

Reference should be made now to FIG. 13, to understand the data processing occurring therein. From the identification of three zero points, namely where one of the sinusoidal functions starts from zero amplitude, increase to its maxima and returns to zero amplitude, and then decreases to its minima and returns back to zero amplitude, in stage 1302 the microprocessor first determines the oscillation period "T" of the sampled signals and thereby determines the oscillation frequency "$\omega$".

At stage 1304, microprocessor 1210 samples and stores values of the amplitudes of the velocity signals obtained from sensors 302 and 304 as $A_k$ and $B_k$, for one period "T", at a rate of $\Delta t = T/1000$.

Then, at stage 1306, microprocessor 1210 computes and accumulates running sums of $b_{11}$, $b_{12}$, $b_{21}$, $b_{22}$ and $V_{1A}$, $V_{1B}$, $V_{2A}$, and $V_{2B}$, according to the following defined relationships:

$$b_{11} = \sum_{k=1}^{1000} \sin^2\left(\omega k \frac{\Delta t}{T}\right)$$

$$b_{12} = \sum_{k=1}^{1000} \sin\left(\omega k \frac{\Delta t}{T}\right)\cos\left(\omega k \frac{\Delta t}{T}\right)$$

$$b_{21} = \sum_{k=1}^{1000} \cos\left(\omega k \frac{\Delta t}{T}\right)\sin\left(\omega k \frac{\Delta t}{T}\right)$$

$$b_{22} = \sum_{k=1}^{1000} \cos^2\left(\omega k \frac{\Delta t}{T}\right)$$

$$V_{1A} = \sum_{k=1}^{1000} A_k \sin\left(\omega k \frac{\Delta t}{T}\right)$$

$$V_{1B} = \sum_{k=1}^{1000} B_k \cos\left(\omega k \frac{\Delta t}{T}\right)$$

$$V_{2A} = \sum_{k=1}^{1000} A_k \sin\left(\omega k \frac{\Delta t}{T}\right)$$

$$V_{2A} = \sum_{k=1}^{1000} B_k \cos\left(\omega k \frac{\Delta t}{T}\right)$$

Note that the subscripts "A" and "B" are being utilized, as indicated earlier, to refer to signals received from the upstream and downstream sensors 302 and respectively.

Thereafter, at stage 1308, after sampling the signals from sensors 302 and 304 for one complete time period "T" for each, microprocessor 1210 computes additional coefficients $C_{1A}$, $C_{2A}$, $C_{1B}$, and $C_{2B}$, according to the following relationships:

$$C_{1A} = \frac{V_{1A}b_{22} - V_{2A}b_{12}}{b_{11}b_{22} - b_{21}b_{12}}$$

$$C_{2A} = \frac{b_{11}V_{2A} - b_{21}V_{1A}}{b_{11}b_{22} - b_{21}b_{12}}$$

$$C_{1B} = \frac{V_{1B}b_{22} - V_{2B}b_{12}}{b_{11}b_{22} - b_{21}b_{12}}$$

$$C_{2B} = \frac{b_{11}V_{2B} - b_{21}V_{1B}}{b_{11}b_{22} - b_{21}b_{12}}$$

Then, in stage 1310, microprocessor 1210 employs the computed values of $C_{1A}$, $C_{1B}$, etc., to determine respective A-B referenced phase angles $\phi_A$ and $\phi_B$, according to:

$$\phi_A = \tan^{-1}(C_{2A}/C_{1A}),$$

and $$\phi_B = \tan^{-1}(C_{2B}/C_{1B})$$

From the computed values of the individual phase angles for the two digitized signals from sensors 302 and 304, in stage 1312 microprocessor 1210 determines the phase angle difference:

$$\phi_{A\text{-}B} = \phi_A - \phi_B$$

For each set of flow conduits comprised within a fluid flow meter of the Coriolis-type, when the device is manufactured the manufacturer must perform an empirical measurement test to determine a proportionality factor "K" to be used as a multiplier to the above-discussed "least-squares fit" phase angle difference to determine an actual fluid mass flow rate in conventional units, e.g., kilograms/seconds, gallons/hour, etc. In other words, the actual mass flow rate is directly proportional to this factor "K" which is unique to each set of conduits comprised within a particular flow meter. "K" may be regarded as representing the influence of geometry, shape, size, fluid properties, etc., for a particular fluid flow rate measurement device of the Coriolis-type, and the actual fluid mass flow rates is given by:

$$\dot{m} = (k/f)\cdot\tan(\phi_{A\text{-}B}/2),$$

where "f" is the oscillation frequency (1/T).

Immediately below is provided a detailed mathematical analysis of the "least-squares fit" as employed in the present invention to obtain a highly precise system and method for determining a fluid mass flow rate using a Coriolis-type meter. Any function f(x) can be represented as a sum of sine and cosine functions as follows:

$$f(x) = C_1\phi_1(x) + C_2\phi_2(x) = C_1 \sin(\omega x) + C_2 \cos(\omega x) \quad \text{Eq. (1)}$$

The Error Function is:

$$e(x_j) = y_j - f(x_j) = y_j - C_1\phi_1(x_j) - C_2\phi_2(x_j) = y_j - C_1\sin(\omega x_j) - C_2\cos(\omega x_j)$$

... at a particular measured data point $(x_j, y_j)$ $j = 1, 2, \ldots, M$; where M = number of data points In matrix form:

$$\overline{E} = \overline{Y} - \overline{AC}$$

$$\begin{bmatrix} e(x_1) \\ e(x_2) \\ e(x_3) \\ \cdot \\ \cdot \\ \cdot \\ e(x_m) \end{bmatrix} = \begin{bmatrix} y_1 \\ y_2 \\ y_3 \\ \cdot \\ \cdot \\ \cdot \\ y_m \end{bmatrix} - \begin{bmatrix} \phi_1(x_1) & \phi_2(x_1) \\ \phi_1(x_2) & \phi_2(x_2) \\ \phi_1(x_3) & \phi_2(x_3) \\ \cdot & \cdot \\ \cdot & \cdot \\ \cdot & \cdot \\ \phi_1(x_m) & \phi_2(x_m) \end{bmatrix} \begin{pmatrix} C_1 \\ C_2 \end{pmatrix}$$

where:

$$E = \begin{bmatrix} e(x_1) \\ e(x_2) \\ e(x_3) \\ \cdot \\ \cdot \\ \cdot \\ e(x_m) \end{bmatrix}; Y = \begin{bmatrix} y_1 \\ y_2 \\ y_3 \\ \cdot \\ \cdot \\ \cdot \\ y_m \end{bmatrix}; A = \begin{bmatrix} \phi_1(x_1) & \phi_2(x_1) \\ \phi_1(x_2) & \phi_2(x_2) \\ \phi_1(x_3) & \phi_2(x_3) \\ \cdot & \cdot \\ \cdot & \cdot \\ \cdot & \cdot \\ \phi_1(x_m) & \phi_2(x_m) \end{bmatrix}; C = \begin{pmatrix} C_1 \\ C_2 \end{pmatrix}$$

Least Square Approximation:

$$\gamma^2 = \sum_{j=1}^{m} [e(x_j)]^2 = \overline{E}^t \overline{E}$$

... minimize $\gamma^2$ which is a function of $C_1, C_2$
Let $\overline{C}_o = \overline{C}$, where $\gamma^2(\overline{C}_o)$ is a minimum value.
$C = \overline{C}_o + s\overline{P}$,
where s and P are arbitrary scalar and vector, respectively.

$$\overline{E}(s) = \overline{Y} - \overline{A}\,\overline{C} = \overline{Y} - \overline{A}(\overline{C}_o + s\overline{P}) = \overline{Y} - \overline{A}\,\overline{C}_o - s\overline{A}\,\overline{P} =$$

$$\overline{E}_o - s\overline{Q}$$

where $\overline{E}_o = \overline{Y} - \overline{A}\,\overline{C}_o$ and $\overline{Q} = \overline{A}\,\overline{P}$
$\gamma^2(s) = \overline{E}^t\overline{E} = (\overline{E}_o^t - s\overline{Q}^t)(\overline{E}_o - s\overline{Q}) = \overline{E}_o^t\overline{E}_o -$ $$s(\overline{Q}^t\,\overline{E}_o + \overline{E}_o^t\,\overline{Q}) + s^2\,\overline{Q}^t\overline{Q}\,\overline{E}_o^t\,\overline{Q} = \overline{Q}^t\,\overline{E}_o = \overline{P}^t\overline{A}^t\,\overline{E}_o$$

and letting $\overline{E}_o^t\,\overline{E}_o = \gamma_o^2$ $\gamma^2(s) = \gamma_o^2 - 2\overline{P}^t(\overline{A}_o^t\,\overline{E}_o)s + (\overline{Q}^t\,\overline{Q})s^2$ Minimizing:

$$\frac{\partial}{\partial s}(\gamma^2(0)) = 0 - 2\,\overline{P}^t\overline{A}^t\,\overline{E}_o = 0$$

Each element of $\overline{P}$ must be zero.

$\overline{P} = \overline{A}^t\,\overline{E}_o$
$\overline{A}^t\,\overline{E}_o = \overline{0}$
$\overline{A}^t(\overline{Y} - \overline{A}\,\overline{C}_o) = \overline{0}$
$\overline{A}^t\,\overline{Y} = \overline{A}^t\overline{A}\,\overline{C}_o$
$\overline{B}\,\overline{C}_o = \overline{V}$ ... equation of least squares error,
where $\overline{B} = \overline{A}^t\,\overline{A}$ $\overline{V} = \overline{A}^t\,\overline{Y}$ $b_{ij} = \sum_{k=1}^{m} a_{ki}a_{kj}\; V_i = \sum_{k=1}^{m} a_{ki}y_k,\; \text{for } i,j = 1,2$ For $f(x) = \sum_{i=1}^{m} C_i\phi_i(x)$ $\overline{A}$ is given by: $a_{ki} = \phi_i(x_k)$
$\overline{B}$ is given by:

$b_{ij} = \sum_{h=1}^{m} \phi_i(x_k)\phi_j(x_k)$ $\overline{V}$ is given by:

$V_i = \sum_{k=1}^{m} \phi_i(x_k)y_k$ for $i,j = 1,2, \ldots n$
For $\phi_1(x) = \sin(\omega x)$
$\phi_2(x) = \cos(\omega x)$
M = number of data points
$k = 1, 2, \ldots, M$ $a_{k1} = \phi_1(x_k) = \sin(\omega x_k)$
$a_{k2} = \phi_2(x_k) = \cos(\omega x_k)$
$k = 1, 2, \ldots, M$ -continued $$b_{11} = \sum_{k=1}^{m} \phi_1(x_k)\phi_1(x_k) = \sum_{k=1}^{m} \sin^2(\omega x_k) \quad \text{Eq. (2)}$$

$$b_{12} = \sum_{k=1}^{m} \phi_1(x_k)\phi_2(x_k) = \sum_{k=1}^{m} \sin(\omega x_k)\cos(\omega x_k) \quad \text{Eq. (3)}$$

$$b_{21} = \sum_{k=1}^{m} \phi_2(x_k)\phi_1(x_k) = \sum_{k=1}^{m} \cos(\omega x_k)\sin(\omega x_k) \quad \text{Eq. (4)}$$

$$b_{22} = \sum_{k=1}^{m} \phi_2(x_k)\phi_2(x_k) = \sum_{k=1}^{m} \cos^2(\omega x_k) \quad \text{Eq. (5)}$$

$$V_1 = \sum_{k=1}^{m} \phi_1(x_k)y_k = \sum_{k=1}^{m} y_k\sin(\omega x_k) \quad \text{Eq. (6)}$$

$$V_2 = \sum_{k=1}^{m} \phi_2(x_k)y_k = \sum_{k=1}^{m} y_k\cos(\omega x_k) \quad \text{Eq. (7)}$$

$\overline{B}\,\overline{C}_o = \overline{Y}$ $$\begin{pmatrix} b_{11} & b_{12} \\ b_{21} & b_{22} \end{pmatrix} \begin{pmatrix} C_1 \\ C_2 \end{pmatrix} = \begin{pmatrix} V_1 \\ V_2 \end{pmatrix}$$

$b_{11} C_1 + b_{12} C_2 = V_1$
$b_{12} C_1 + b_{22} C_2 = V_2$

Values of $b_{ij}$ and $V_i$ are as given above.
Solving for $C_1, C_2$ which yields the least-squares error:

$$C_1 = \frac{\begin{vmatrix} V_1 & b_{12} \\ V_2 & b_{22} \end{vmatrix}}{\begin{vmatrix} b_{11} & b_{12} \\ b_{12} & b_{22} \end{vmatrix}} \quad C_2 = \frac{\begin{vmatrix} b_{11} & V_1 \\ b_{21} & V_2 \end{vmatrix}}{\begin{vmatrix} b_{11} & b_{12} \\ b_{21} & b_{22} \end{vmatrix}}$$

$$C_1 = \frac{V_1 b_{22} - V_2 b_{12}}{b_{11}b_{22} - b_{21}b_{12}} \quad \text{Eq. (8)}$$

$$C_2 = \frac{b_{11}V_2 - b_{21}V_1}{b_{11}b_{22} - b_{21}b_{12}} \quad \text{Eq. (9)}$$

$f(t) = C_1 \sin(\omega t) + C_2 \cos(\omega t)$
Letting $f(x) = A \sin(\omega t + \phi)$,
$A \sin(\omega t + \phi) = C_1 \sin(\omega t) + C_2 \cos(\omega t)$
$\sin(\omega t + \phi) = C_1/A \sin(\omega t) + C_2/A \cos(\omega t)$
Using trigonometric identity:
$\sin(\omega t + \phi) = \sin(\omega t)\cos(\phi) + \cos(\omega t)\sin(\phi)$
$C_1/A = \cos(\phi)$
$C_2/A = \sin(\phi)$
$\tan(\phi) = C_2/C_1$
Therefore,
$\phi = \tan^{-1}(C_2/C_1)$
$(C_1/A)^2 + (C_2/A)^2 = \cos^2(\phi) + \sin^2(\phi)$
$C_1^2/A^2 C_2^2/A^2 = 1$
$A^2 = C_1^2 + C_2^2$
$A = (C_1^2 + C_2^2)^{\frac{1}{2}}$, the calculated amplitude.
Phase angle derived from least-squares curve fit of the sine functions:
$\phi = \tan^{-1}(C_2/C_1)$, the calculated phase angle.
The "least-squares fit" technique requires far less computational capability, is faster, and more economical than other known techniques for processing such data, particularly for the type of application discussed above, i.e., to determine a fluid mass flow rate using a particularly for the type of application discussed above, i.e., to determine a fluid mass flow rate using a Coriolis-type fluid flow rate meter. It is also considered to be highly insensitive to temperature-induced effects, the effects of harmonic distortions, and the combined effects of random noise and harmonic distortions. The following examples are considered sufficient to clearly establish these particular advantages and provide assurance that the mathematical processing of the analog sine signals by applying a least-squares fit thereto does not result in any significant error.

Figure 18:
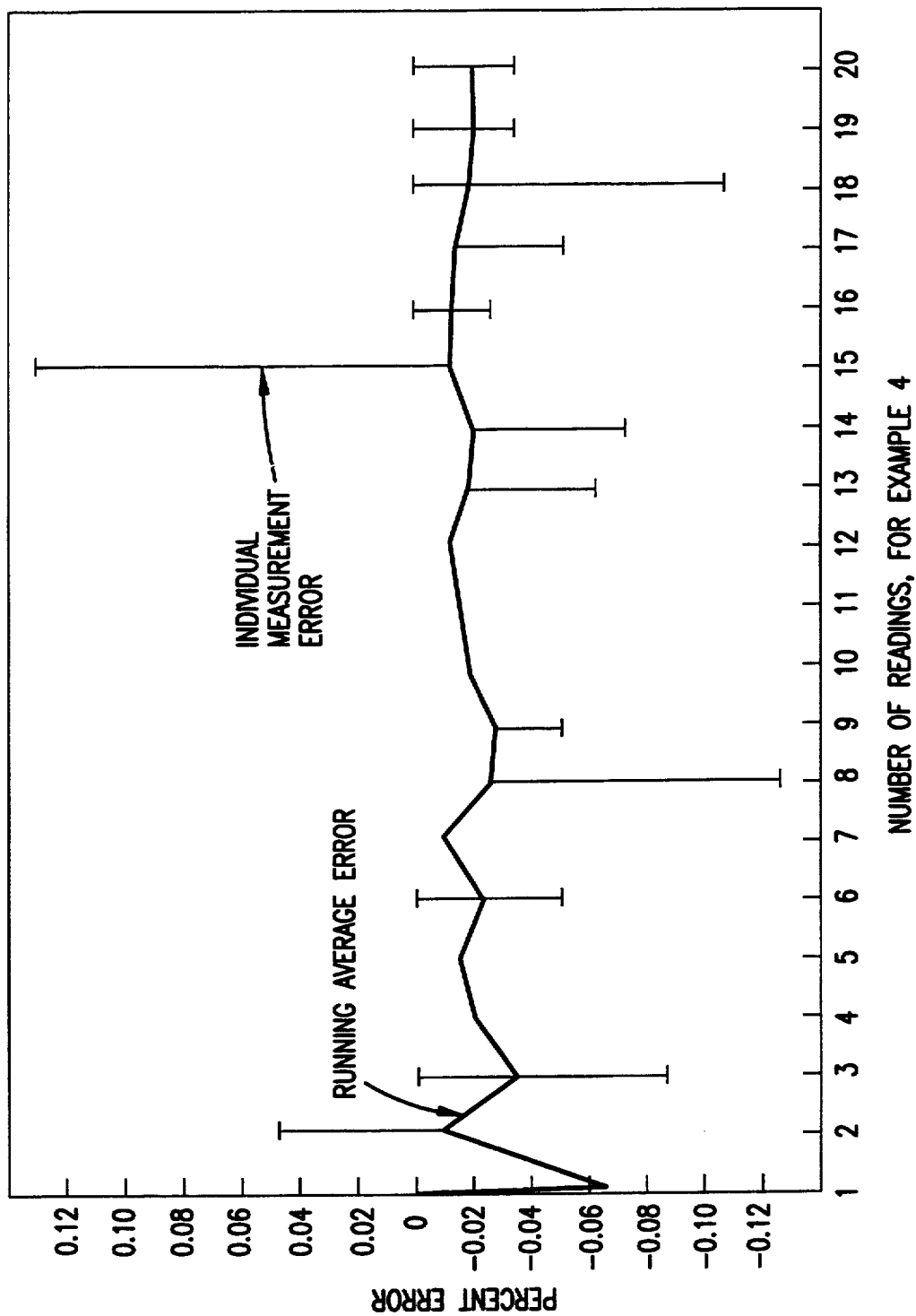
FIG. 18 is a plot of Percentage Error vs. Number of Readings, presenting data on individual measurement errors and a running average error, for the least-squares fit to the data per FIG. 17.

FIG. 14 relates to Example 1, FIG. 15 relates to Example 2, FIG. 16 relates to Example 3 and FIGS. 17 and 18 relate to Example 4.

Immediately below is provided the essential information to appreciate the quality of the results obtained in Examples 1–4.

EXAMPLE 1

MATHEMATICAL SIMULATION OF A LEAST SQUARES SINE FIT $M = 1024$ Number of data points
Generate data points:
$j = 0, 1, \ldots M - 1$
$A = 1$ Amplitude of sine function
$T = 100$ Period of sine function in msec.
$P = 6.000001$ Phase angle of sine function in degrees
$DT = 0.1$ Sample Period in msec.

$$y_j = A \cdot \sin\left[ 2 \cdot \pi \cdot DT \cdot \frac{j}{T} + 2 \cdot \pi \cdot \frac{P}{360} \right]$$

LEAST SQUARES FIT

Calculate B matrix coefficients:

$k = 0, 1, \ldots M - 1$ $$b_{11} = \sum_k \sin\left[ 2 \cdot \pi \cdot DT \cdot \frac{k}{T} \right] \cdot \sin\left[ 2 \cdot \pi \cdot DT \cdot \frac{k}{T} \right]$$
$b_{11} = 500.1699626642$ $$b_{12} = \sum_k \sin\left[ 2 \cdot \pi \cdot DT \cdot \frac{k}{T} \right] \cdot \cos\left[ 2 \cdot \pi \cdot DT \cdot \frac{k}{T} \right]$$
$b_{12} = 1.7215986747$ $$b_{21} = \sum_k \cos\left[ 2 \cdot \pi \cdot DT \cdot \frac{k}{T} \right] \cdot \sin\left[ 2 \cdot \pi \cdot DT \cdot \frac{k}{T} \right]$$
$b_{21} = 1.7215986747$ $$b_{22} = \sum_k \cos\left[ 2 \cdot \pi \cdot DT \cdot \frac{k}{T} \right] \cdot \cos\left[ 2 \cdot \pi \cdot DT \cdot \frac{k}{T} \right]$$
$b_{22} = 523.8300373358$ Calculate V Matrix coefficients:

$$V_1 = \sum_k y_k \cdot \sin\left[ 2 \cdot \pi \cdot DT \cdot \frac{k}{T} \right] \quad V_1 = 497.6099344564$$

$$V_2 = \sum_k y_k \cdot \cos\left[ 2 \cdot \pi \cdot DT \cdot \frac{k}{T} \right] \quad V_2 = 56.4673254825$$

Solve for coefficients:

$$C_1 = \frac{(V_1 \cdot b_{22} - V_2 \cdot b_{12})}{(b_{11} \cdot b_{22} - b_{21} \cdot b_{12})} \quad C_1 = 0.9945218935$$

$$C_2 = \frac{(b_{11} \cdot V_2 - b_{21} \cdot V_1)}{(b_{11} \cdot b_{22} - b_{21} \cdot b_{12})} \quad C_2 = 0.1045284806$$

Calculate derived amplitude and phase angle:

$$LA = \sqrt{C_1^2 + C_2^2} \quad \text{calculated amplitude derived from least squares}$$
$LA = 1$ $$LP = \frac{360}{[2\pi]} \cdot \operatorname{atan}\left[ \frac{C_2}{C_1} \right] \quad \text{calculated phase angle derived from least squares}$$
$LP = 6.000001$

EXAMPLE 2

MATHEMATICAL SIMULATION OF A LEAST SQUARES SINE FIT, INCLUDING TEMPERATURE-INDUCED OFFSET $M = 2048$ Number of data points
Generate data points:
$j = 0, 1, \ldots M - 1$
$A = 1$ Amplitude of sine function
$T = 204.8$ Period of sine function in msec.
$P = 6.000001$ Phase angle of sine function in degrees
$DT - 0.1$ Sample Period in msec.

$$y_j = 0.5 + A \cdot \sin\left[ 2 \cdot \pi \cdot DT \cdot \frac{j}{T} + 2 \cdot \pi \cdot \frac{P}{360} \right]$$
$y_1 = y$

LEAST-SQUARES FIT

Calculate B matrix coefficients:

$$b_{11} = \sum_j \sin\left[ 2 \cdot \pi \cdot DT \cdot \frac{j}{T} \right] \cdot \sin\left[ 2 \cdot \pi \cdot DT \cdot \frac{j}{T} \right]$$
$b_{11} = 1.024 \cdot 10^3$ $$b_{12} = \sum_j \sin\left[ 2 \cdot \pi \cdot DT \cdot \frac{j}{T} \right] \cdot \cos\left[ 2 \cdot \pi \cdot DT \cdot \frac{j}{T} \right]$$
$b_{12} = -1.9395075823 \cdot 10^{-14}$ $$b_{21} = \sum_j \cos\left[ 2 \cdot \pi \cdot DT \cdot \frac{j}{T} \right] \cdot \sin\left[ 2 \cdot \pi \cdot DT \cdot \frac{j}{T} \right]$$
$b_{21} = -1.9395075823 \cdot 10^{-14}$ $$b_{22} = \sum_j \cos\left[ 2 \cdot \pi \cdot DT \cdot \frac{j}{T} \right] \cdot \cos\left[ 2 \cdot \pi \cdot DT \cdot \frac{j}{T} \right]$$
$b_{22} = 1.024 \cdot 10^3$ Calculate V Matrix coefficients:

$$V_1 = \sum_j y_{1j} \cdot \sin\left[ 2 \cdot \pi \cdot DT \cdot \frac{j}{T} \right] \quad V_1 = 1.018390419 \cdot 10^3$$

$$V_2 = \sum_j y_{1j} \cdot \sin\left[ 2 \cdot \pi \cdot DT \cdot \frac{j}{T} \right] \quad V_2 = 107.0371641603$$

Solve for coefficients:

$$C_1 = \frac{(V_1 \cdot b_{22} - V_2 \cdot b_{12})}{(b_{11} \cdot b_{22} - b_{21} \cdot b_{12})} \quad C_1 = 0.9945218935$$

$$C_2 = \frac{(b_{11} \cdot V_2 - b_{21} \cdot V_1)}{(b_{11} \cdot b_{22} - b_{21} \cdot b_{12})} \quad C_2 = 0.1045284806$$

Calculate derived amplitude and phase angle:

$$LA = \sqrt{C_1^2 + C_2^2} \quad \text{calculated amplitude derived from least squares}$$

$$LA = 1$$

$$LP = \frac{360}{[2\pi]} \cdot \text{atan}\left[\frac{C_2}{C_1}\right] \quad \text{calculated phase angle derived from least squares}$$

$$LP = 6.000001$$

EXAMPLE 3

MATHEMATICAL SIMULATION OF A LEAST SQUARES SINE FIT, INCLUDING THE EFFECTS DUE TO A HARMONIC DISTORTION $M = 2048$ Number of data points
Generate data points:
$j = 0, 1, \ldots M - 1$
$A = 1$ Amplitude of sine function
$T = 204.8$ Period of sine function in msec.
$P = 6.000001$ Phase angle of sine function in degrees
$DT = 0.1$ Sample Period in msec.
$h = 2, 3 \ldots 10$ $$y_j = A \cdot \sin\left[2 \cdot \pi \cdot DT \cdot \frac{j}{T} + 2 \cdot \pi \cdot \frac{P}{360}\right] +$$

$$\sum_h \frac{0.3}{h} \cdot A \cdot \sin\left[2 \cdot \pi \cdot h \cdot DT \cdot \frac{j}{T}\right]$$

$$y_1 = y$$

LEAST SQUARES FIT

Calculate B matrix coefficients:

$$b_{11} = \sum_j \sin\left[2 \cdot \pi \cdot DT \cdot \frac{j}{T}\right] \cdot \sin\left[2 \cdot \pi \cdot DT \cdot \frac{j}{T}\right]$$
$$b_{11} = 1.024 \cdot 10^3$$

$$b_{12} = \sum_j \sin\left[2 \cdot \pi \cdot DT \cdot \frac{j}{T}\right] \cdot \cos\left[2 \cdot \pi \cdot DT \cdot \frac{j}{T}\right]$$
$$b_{12} = -1.9395075823 \cdot 10^{-14}$$

$$b_{21} = \sum_j \cos\left[2 \cdot \pi \cdot DT \cdot \frac{j}{T}\right] \cdot \sin\left[2 \cdot \pi \cdot DT \cdot \frac{j}{T}\right]$$
$$b_{21} = -1.9395075823 \cdot 10^{-14}$$

$$b_{22} = \sum_j \cos\left[2 \cdot \pi \cdot DT \cdot \frac{j}{T}\right] \cdot \cos\left[2 \cdot \pi \cdot DT \cdot \frac{j}{T}\right]$$
$$b_{22} = 1.024 \cdot 10^3$$

Calculate V Matrix coefficients:

$$V_1 = \sum_j y_{1j} \cdot \sin\left[2 \cdot \pi \cdot DT \cdot \frac{j}{T}\right] V_1 = 1.018390419 \cdot 10^3$$

$$V_2 = \sum_j y_{1j} \cdot \sin\left[2 \cdot \pi \cdot DT \cdot \frac{j}{T}\right] V_2 = 107.0371641603.$$

Solve for coefficients:

$$C_1 = \frac{(V_1 \cdot b_{22} - V_2 \cdot b_{12})}{(b_{11} \cdot b_{22} - b_{21} \cdot b_{12})} \quad C_1 = 0.9945218935$$

$$C_2 = \frac{(b_{11} \cdot V_2 - b_{21} \cdot V_1)}{(b_{11} \cdot b_{22} - b_{21} \cdot b_{12})} \quad C_2 = 0.1045284806$$

Calculate derived amplitude and phase angle:

$$LA = \sqrt{C_1^2 + C_2^2} \quad \text{calculated amplitude derived from least squares}$$

$$LA = 1$$

$$LP = \frac{360}{[2\pi]} \cdot \text{atan}\left[\frac{C_2}{C_1}\right] \quad \text{calculated phase angle derived from least squares}$$

$$LP = 6.000001$$

EXAMPLE 4

MATHEMATICAL SIMULATION OF A LEAST SQUARES SINE FIT, INCLUDING EFFECTS DUE TO RANDOM NOISE AND HARMONIC DISTORTION $M = 2048$ Number of data points
Generate data points:
$j = 0, 1, \ldots M - 1$
$A = 1$ Amplitude of sine function
$T = 204.8$ Period of sine function in msec.
$P = 6$ Phase angle of sine function in degrees
$DT = 0.1$ Sample Period in msec.
$h = 2, 3 \ldots 10$ $$y_j = RND(0.01) -$$

$$0.005 + A \cdot \sin\left[2 \cdot \pi \cdot DT \cdot \frac{j}{T} + 2 \cdot \pi \cdot \frac{P}{360}\right] +$$

$$\sum_h \frac{0.3}{h} \cdot A \cdot \sin\left[2 \cdot \pi \cdot h \cdot DT \cdot \frac{j}{T}\right]$$

$$y_1 = y$$

LEAST SQUARES FIT

Calculate B matrix coefficients:

$$b_{11} = \sum_j \sin\left[2 \cdot \pi \cdot DT \cdot \frac{j}{T}\right] \cdot \sin\left[2 \cdot \pi \cdot DT \cdot \frac{j}{T}\right]$$
$$b_{11} = 1.024 \cdot 10^3$$

$$b_{12} = \sum_j \sin\left[2 \cdot \pi \cdot DT \cdot \frac{j}{T}\right] \cdot \cos\left[2 \cdot \pi \cdot DT \cdot \frac{j}{T}\right]$$
$$b_{12} = -1.9395075823 \cdot 10^{-14}$$

-continued $$b_{21} = \sum_j \cos\left[2 \cdot \pi \cdot DT \cdot \frac{j}{T}\right] \cdot \sin\left[2 \cdot \pi \cdot DT \cdot \frac{j}{T}\right]$$
$$b_{21} = -1.9395075823 \cdot 10^{-14}$$

$$b_{22} = \sum_j \cos\left[2 \cdot \pi \cdot DT \cdot \frac{j}{T}\right] \cdot \cos\left[2 \cdot \pi \cdot DT \cdot \frac{j}{T}\right]$$
$$b_{22} = 1.024 \cdot 10^3$$

Calculate V Matrix coefficients:

$$V_1 = \sum_j y_{1j} \cdot \sin\left[2 \cdot \pi \cdot DT \cdot \frac{j}{T}\right] \quad V_1 = 1.018386934 \cdot 10^3$$

$$V_2 = \sum_j y_{1j} \cdot \sin\left[2 \cdot \pi \cdot DT \cdot \frac{j}{T}\right] \quad V_2 = 106.9958408108$$

Solve for coefficients:

$$C_1 = \frac{(V_1 \cdot b_{22} - V_2 \cdot b_{12})}{(b_{11} \cdot b_{22} - b_{21} \cdot b_{12})} \quad C_1 = 0.9945184903$$

$$C_2 = \frac{(b_{11} \cdot V_2 - b_{21} \cdot V_1)}{(b_{11} \cdot b_{22} - b_{21} \cdot b_{12})} \quad C_2 = 0.1044881258$$

Calculate derived amplitude and phase angle:

$$LA = \sqrt{C_1^2 + C_2^2} \quad \text{calculated amplitude derived from least squares}$$
$$LA = 0.9999923979$$

$$LP = \frac{360}{[2\pi]} \cdot \operatorname{atan}\left[\frac{C_2}{C_1}\right] \quad \text{calculated phase angle derived from least squares}$$
$$LP = 5.9977218696$$

As will be readily appreciated by persons of ordinary skill in the art, both the apparatus and the method can be readily extended in known manner to enable a user to determine, conveniently display, and conventionally record not only the fluid flow rate but, by integrating over time, to also determine a total amount of flow measured over a predetermined time period. In other words, the microprocessor means can be readily programmed to determine a start time at which the fluid flow rate which is being measured is initiated, e.g., by controlled opening of a fluid flow valve 1250 (see FIG. 12) and, upon the expiration of a predetermined period of time, shutting off the valve. The microprocessor, with conventional timing means included, can also be readily programmed to shut off the flow when a predetermined amount, e.g., mass (kg.) or volume (ft³/hr) has been flowed through the meter. Any conventional data display and/or data recording means 1260, as indicated in FIG. 12, may be provided for use with microprocessor 1210. The elements of apparatus, their use, and the required programming of the microprocessor, are all considered to be well within the skill of persons of ordinary skill in the art and, therefore, need not be described here in detail.

In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

What is claimed is:

1. An improved Coriolis-type system for measuring a fluid flow rate, comprising:
    a first fluid flow conduit having fixed inlet and outlet portions which are substantially coaxial with a first oscillation axis and a middle portion, comprising a curve which is offset relative to the first oscillation axis;
    a second fluid flow conduit having respective inlet and outlet portions which are substantially coaxial with a second oscillation axis parallel to said first oscillation axis and a respective middle portion, comprising a curve, which is offset from the second oscillation axis, the second conduit being formed to be physically similar to the first conduit, the first and second conduits being mounted to be parallel to each other between their respective end portions when not in use;
    means for oscillating the first and second conduits relative to each other about their respective oscillation axes, thereby causing oscillating Coriolis accelerations to act on respective fluid flows through the two conduits and generating a corresponding relative oscillatory motion of the conduits;
    means for generating analog sinusoidal outputs at two locations in correspondence with said relative motion between the first and second conduits at these two locations;
    means for digitizing the analog sinusoidal outputs and generating corresponding digitized outputs; and
    means for processing said digitized outputs to generate least-squares sine fits thereto, determining a phase shift between the digitized outputs, and from said phase shift determining a corresponding mass flow rate of fluid flowing through the first and second conduits.

2. The system according to claim 1, further comprising:
    means for determining a natural resonance frequency for the physically similar first and second conduits and for oscillating the first and second conduits relative to each other at the determined resonance frequency.

3. The system according to claim 2, comprising:
    means for programmably controlling said oscillating means, said analog sinusoidal output generating means, said digitizing means, and said processing means.

4. The system according to claim 1, further comprising:
    means for controlling said measured fluid flow to limit the same to a predetermined amount.

5. The system according to claim 4, further comprising:
    means for selectively displaying and recording said flow rate and said amounts of flow.

6. A method of determining a phase difference between a first sinusoidal analog signal having a predetermined frequency and a second sinusoidal analog signal having the same predetermined frequency, wherein the first and second sinusoidal signals are phase-shifted relative to each other in correspondence with a physical parameter, comprising the steps of:

converting said first and second sinusoidal analog signals to corresponding first and second digitized signals;

generating least-squares sine fits of said first and second digitized signals, and thereby determining a phase shift between said first and second analog signals; and determining a value of said physical parameter corresponding to said determined phase shift.

7. The method according to claim 6, comprising the further steps of:

empirically determining a proportionality factor relating values of phase shift to corresponding values of said physical parameter; and using the proportionality factor and the determined phase shift to determine said corresponding value of the physical parameter.

8. A method of determining a rate of fluid flow through a Coriolis-type fluid flow rate meter, comprising the steps of:

dividing said fluid flow into equal flows and flowing said half flows through two conduits having respective inlet and outlet end portions coaxially affixed on respective first and second oscillation axes which are mutually parallel;

applying an oscillatory motion between respective middle portions of said conduits at a natural resonance frequency thereof;

obtaining analog sinusoidal signals corresponding to relative velocity of motion between the two conduits at two separate locations thereof while each of the conduits is conveying a corresponding one of said half flows and is being subjected to said oscillatory motion;

digitizing said analog sinusoidal signals and generating corresponding least-squares fit thereto for one oscillation time period; and from said least-squares fits determining a phase shift related to the fluid flow through both of said conduits.

9. The method according to claim 8, comprising the further steps of:

empirically determining a proportionality factor relating values of phase shift to corresponding values of flow; and using the proportionality factor and the determined phase shift to determine said flow.

10. The method according to claim 8, comprising the further step of:

controlling said fluid flow to terminate the same when a predetermined amount of fluid has been flowed.

11. The method according to claim 10, comprising the further step of:

integrating the flow over a predetermined period of time to determine an amount of fluid flowed over said period of time.

12. The method according to claim 11, comprising the further step of:

selectively displaying and recording said fluid flow and said amount.

* * * * *